United States Patent [19]
Auerbach et al.

[11] Patent Number: 5,896,372
[45] Date of Patent: Apr. 20, 1999

[54] METHOD AND APPARATUS FOR CREATING VIRTUAL HIGH BANDWIDTH DATA CHANNELS

[75] Inventors: Richard Allan Auerbach, Somers; Charles Louis Haymes, Wesley Hills; Dominick Anthony Zumbo, Carmel, all of N.Y.

[73] Assignee: International Business Machines Corporation, Armonk, N.Y.

[21] Appl. No.: 08/802,737

[22] Filed: Feb. 20, 1997

[51] Int. Cl.⁶ .................................................. H04B 1/44
[52] U.S. Cl. .......................... 370/282; 370/295; 370/468; 375/222
[58] Field of Search .................................. 370/276, 277, 370/280, 281, 294, 295, 282, 468; 375/222; 379/98, 97, 96, 93, 93.08

[56] References Cited

U.S. PATENT DOCUMENTS

| | | | |
|---|---|---|---|
| 4,882,726 | 11/1989 | Lang et al. | 370/294 |
| 4,890,316 | 12/1989 | Walsh et al. | 379/98 |
| 5,117,423 | 5/1992 | Shepherd et al. | 370/294 |
| 5,420,851 | 5/1995 | Seshadri et al. | 370/294 |
| 5,586,121 | 12/1996 | Moura et al. | 370/404 |

*Primary Examiner*—Ajit Patel
*Attorney, Agent, or Firm*—Whitham, Curtis & Whitham.; Robert P. Tassinari, Esq.

[57] ABSTRACT

A method and apparatus creates a virtual high bandwidth, bi-directional, communications link utilizing low and high bandwidth uni-directional links in opposite directions. The directions of the two uni-directional communications links can be dynamically reversed in response to changing traffic needs.

8 Claims, 4 Drawing Sheets

METHOD AND APPARATUS FOR CREATING VIRTUAL HIGH BANDWIDTH DATA CHANNELS

BACKGROUND OF THE INVENTION

1. Field of the Invention

The present invention generally relates to bi-directional communication links comprised of a high bandwidth link and a low bandwidth link and, more particularly, to such communications links in which the direction of the high bandwidth link is dynamically reversed in response to data traffic conditions to create virtual high bandwidth data channels in both directions.

2. Background Description

There are several systems with a bi-directional communication link where the bandwidth in one direction must always be far greater than the bandwidth in the other direction. Such systems, however, cannot handle wide variations in data traffic flowing in the low bandwidth direction.

In database systems that do database queries and information retrieval, a user sends a query to some information server and receives a response. The query message comprises a small amount of bytes, but the response could be a very large data stream comprising graphics, images and text. These systems require a high bandwidth link downstream to the user and a low bandwidth link upstream to the server. However, users often have large databases on their local machine that need to be transferred to another location. For example, a local business office may execute many transactions during the day on a local database and then require that the database be backed up to a remote site. During the day, transactions information are received from some central server on the high bandwidth link. At the end of the day, the high bandwidth link is required in the reverse direction to provide speedy backup.

Browsing the World Wide Web on the Internet is another application that requires links with different bandwidths in each direction. When a user is browsing another site, the high bandwidth link is required in the downstream direction. However, the user may have a set of web pages on the local machine that are being read by a remote site. In this case, the high bandwidth link is needed in the upstream direction.

SUMMARY OF THE INVENTION

It is therefore an object of the present invention to provide a method and apparatus for creating a virtual high bandwidth, bi-directional, communications link utilizing low and high bandwidth uni-directional links in opposite directions.

According to the invention, there is provided two uni-directional communications links whose directions can be dynamically reversed. A bandwidth management protocol between two stations allows the asymmetrical links to be reversed in response to changing traffic needs.

A communications media provides a bi-directional link between two stations but restricts the bandwidth in one direction to a fraction of the total bandwidth supported by the link. In such a system, high bandwidth communication is only provided in one direction. By making the direction of the high bandwidth link dynamically reversible, the system can provide each station with the ability to either send or receive along a high bandwidth link. The system time shares the high bandwidth connection using a protocol running on the stations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
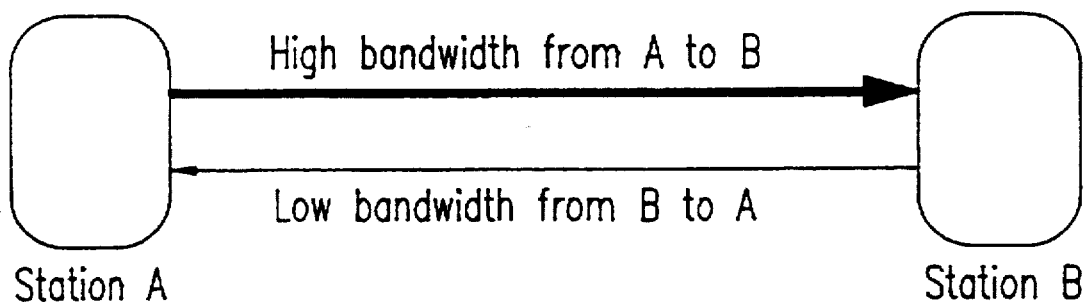
FIGS. 1A and 1B diagramatically illustrate the two states of the bi-directional communication channels according to the invention.
Figure 1B:
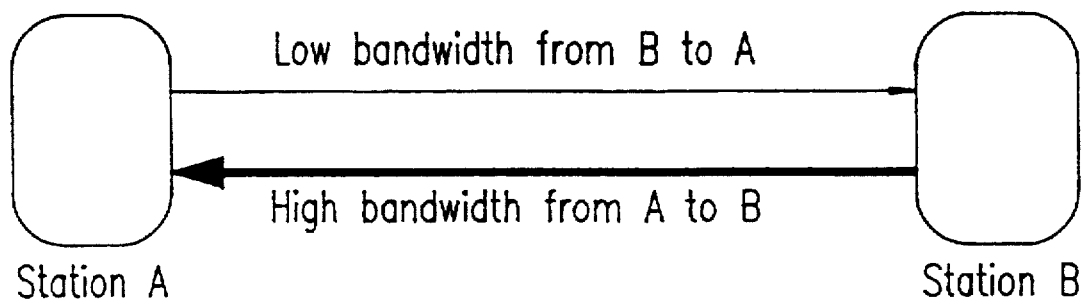

Referring now to the drawings, and more particularly to FIGS. 1A and 1B, there is shown two stations with an asymmetrical bi-directional communications link. The link is reversible. FIG. 1A shows "state A", where station A is using the high bandwidth channel to transmit to station B. FIG. 1B shows "state B" with the link reversed, where station B is using the high bandwidth channel to transmit to station A.

Figure 2:
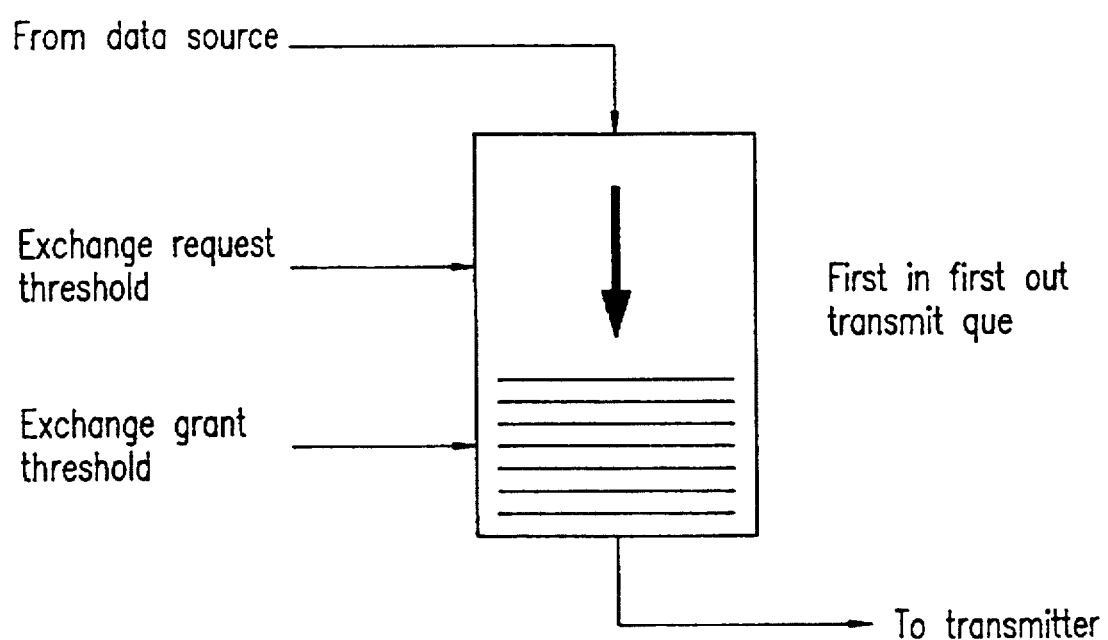
FIG. 2 is a block diagram showing a transmit buffer as located at both stations shown in FIGS. 1A and 1B.
Figure 3:
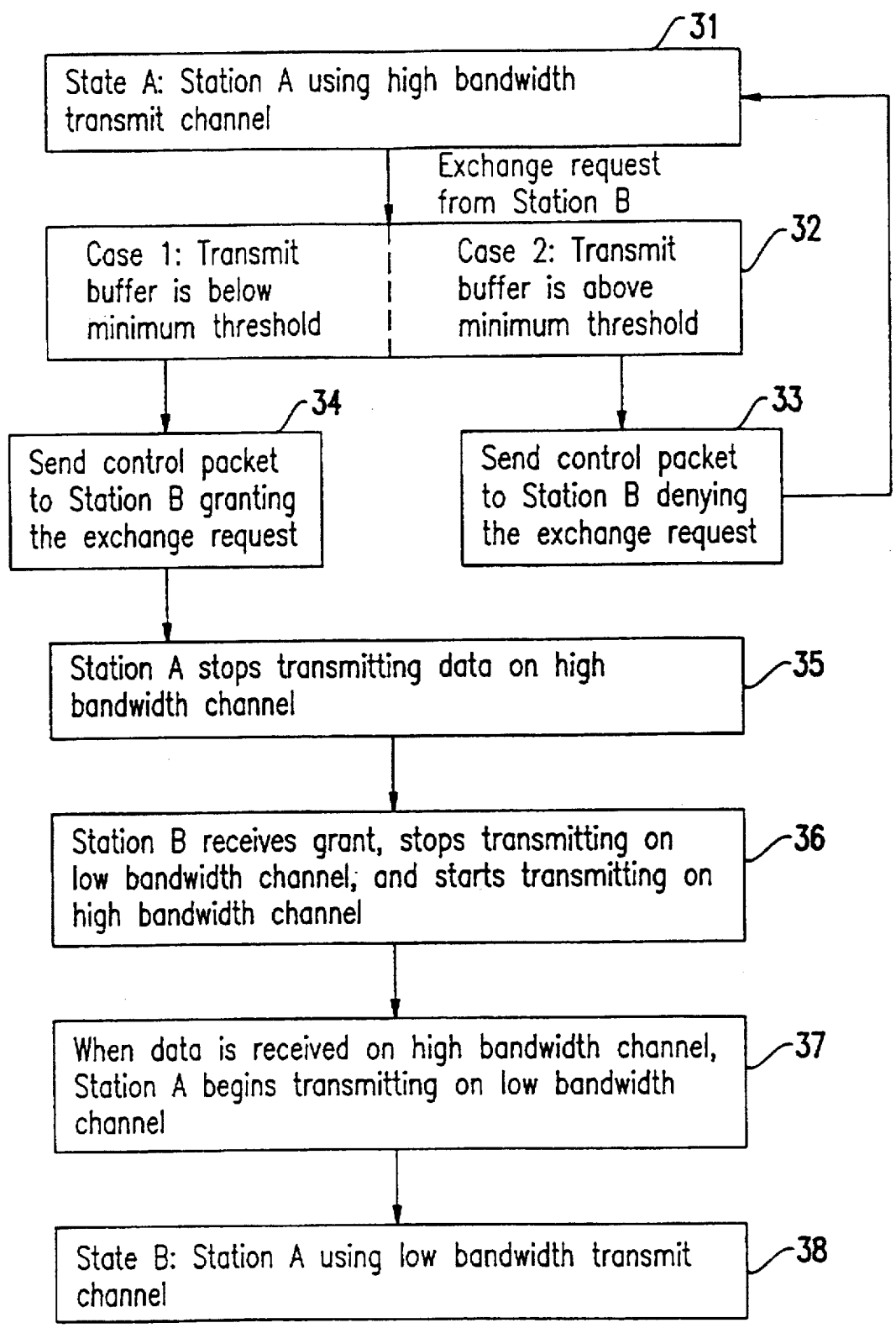
FIG. 3 is a flow diagram of the control flow of the exchange between Stations A and B when going from high bandwidth transmit to low.
Figure 4:
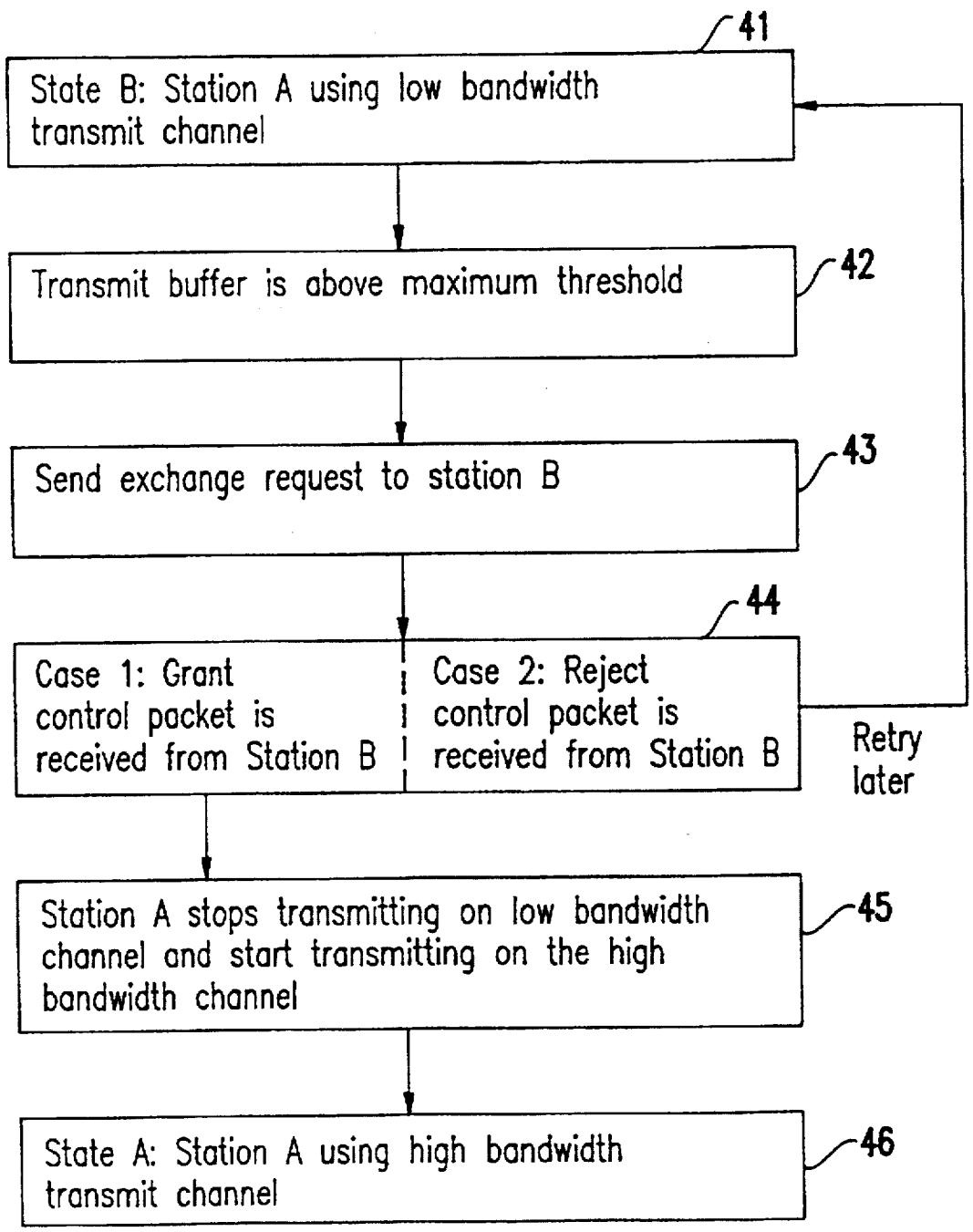
FIG. 4 is a flow diagram of the control flow of the exchange between Stations A and B when going from low bandwidth transmit to high.

FIG. 2 shows a transmit buffer. Such a transmit buffer is provided in each of the two stations. Data is queued in the transmit buffer before being transmitted. This is a first-in, first-out or FIFO buffer. Note that there are two thresholds relative to the depth of the data queued in the buffer. These thresholds are used by the protocols running on stations A and B to dynamically reverse the direction of the high bandwidth channel. FIGS. 3 and 4 show the control flow of the exchange process when going from high bandwidth transmit to low, and when going from low bandwidth to high.

The process of reversing or exchanging the link is as follows. Two stations, A and B, are connected through a bi-directional link. Station B's transmit link is high bandwidth while its receive link is low bandwidth. Station A's receive link is high bandwidth while its transmit link is low bandwidth. When Station A's transmit buffer fills up and reaches a set maximum threshold, Station A will immediately send a control packet to Station B requesting that the high bandwidth direction be reversed. Station B, upon receiving the control packet, checks its transmit buffer. One of two cases will occur:

Case 1: If Station B's transmit buffer is below a set minimum threshold, then

1. Station B sends a control packet to Station A granting the request.
2. Station B stops transmitting on high bandwidth link.
3. Station B listens for data on high bandwidth link as well as low bandwidth link.
4. Station A receives the control packet granting its request.
5. Station A stops transmitting on low bandwidth link.
6. Station A starts transmitting on high bandwidth link.
7. Station A listens for data on low bandwidth link.
8. Station B receives data on high bandwidth link.
9. Station B starts transmitting on low bandwidth link.
10. Station A receives data on low bandwidth link.

Case 2: If station B's transmit buffer is above a set threshold, then

1. Station B sends a control packet to Station A denying the request.

2. Station A retries at a later time.

Referring to FIG. 3, the control flow of the exchange process when going from high bandwidth transmit to low bandwidth transmit is described in more detail. The process begins in function block 31 with the bi-directional communication link in State A with Station A using the high bandwidth transmit channel (i.e., FIG. 1A). An exchange request is received from Station B, and a test is made in decision block 32 to determine which of the two cases is true. Specifically, for case 1 to be true, Station A's transmit buffer must be below the minimum threshold, but for case 2 to be true, Station A's transmit buffer is above the minimum threshold. If case 2 is true, Station A sends a control packet to Station B denying the exchange request in function block 33. The control process then loops back to function block 31 with no change. Station B, after an appropriate time period, repeats the exchange request.

If case 1 is true, then Station A sends a control packet to Station B in function block 34 granting the exchange request. Station A then stops transmitting data on the high bandwidth channel in function block 35. Station B receives the grant in function block 36, stops transmitting on the low bandwidth channel, and starts transmitting on the high bandwidth channel. When data is received on the high bandwidth channel, Station A begins transmitting on the low bandwidth channel in function block 37. At this point, the status of the bi-directional communication link is in State B (FIG. 1B), with station A using the low bandwidth transmit channel in function block 38.

Referring next to FIG. 4, the control flow of the exchange process when going from low bandwidth transmit to high is described in more detail. The process begins in State B in function block 41. The transmit buffer of Station A is above the maximum threshold in function block 42 and, as a result, Station A transmits an exchange request to Station B in function block 43. A determination is made in decision block 44 which of case 1 or case 2 is true. If case 2 is true, Station B rejects the request and the process loops back to function block 41. If case 1 is true, Station B grants the request and, in function block 45, Station A stops transmitting on the low bandwidth channel and starts transmitting on the high bandwidth channel. At this point, the process is in State A, as indicated in function block 46.

Two products entering the market can benefit from the invention. One is the Asymmetric Digital Subscriber Line (ADSL) modem and the other is the 56 Kbs modem. In both products, a high bandwidth connection is supported in one direction only. This invention enhances these products by allowing the direction of the high bandwidth link to dynamically reverse in response to data traffic conditions.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of managing a bi-directional link between two stations to create virtual high bandwidth data channels between the two stations comprising the steps of:

restricting the bandwidth of the bi-directional link in one direction to a fraction of the total bandwidth supported by the link so that high bandwidth communication is only provided in one direction;

sending a bandwidth exchange transmit signal from one of said two stations transmitting along a low bandwidth link to another of two stations transmitting along a high bandwidth link;

determining whether an exchange grant threshold is exceeded in a threshold buffer of said another of two stations transmitting along said high bandwidth link; and dynamically reversing the direction of the high bandwidth link when said exchange grant threshold is not exceeded so that said one of two stations transmitting along said low bandwidth link is provided with the ability to send along a high bandwidth link.

2. The method recited in claim 1 further comprising the steps of:

detecting an exchange request threshold at the one of the two stations which is transmitting on the low bandwidth link;

transmitting an exchange request message from the one station to the another of the two stations; and waiting for a response from the another station.

3. The method recited in claim 2 further comprising the steps of:

determining at the another station whether an exchange grant threshold is exceeded; and if the exchange grant threshold is not exceeded, granting by the another station the exchange request from the one station, thereby reversing the direction of the high bandwidth link.

4. The method recited in claim 3 further comprising the steps of:

if the exchange grant threshold is exceeded, denying by the another station the exchange request from the one station; and after a predetermined period of time, repeating the step of transmitting an exchange request message from the one station to the another station.

5. A system for managing a bi-directional link between first and second stations to create virtual high bandwidth data channels between the first and second stations comprising:

first and second transmit buffers respectively located at the first and second stations, each said transmit buffer having an exchange request threshold and an exchange grant threshold;

channel means for restricting the bandwidth of the bi-directional link in one direction to a fraction of the total bandwidth supported by the link so that high bandwidth communication is only provided in one direction;

sending means for sending a bandwidth exchange transmit signal from one of said first and second stations transmitting along a low bandwidth link to another of said first and second stations transmitting along a high bandwidth link;

determining means for determining whether an exchange grant threshold is exceeded in a threshold buffer of said another of said first and second stations transmitting along the high bandwidth link; and control means responsive to said first and second transmit buffers for dynamically reversing the direction of the high bandwidth link when said exchange grant threshold is not exceeded so that said station transmitting along said low bandwidth link is provided with the ability to send along said high bandwidth link.

6. The system recited in claim 5 wherein said control means comprises at each station:

means for detecting an exchange request threshold at a corresponding one of the first and second transmit buffers;

means for transmitting an exchange request message on the low bandwidth link when the exchange request threshold is exceeded and transmission is currently on the low bandwidth link.

7. The system recited in claim 6 wherein said control means further comprises at each station means responsive to an exchange request message for determining whether an exchange grant threshold is exceeded and, if the exchange grant threshold is not exceeded, granting the exchange request, thereby reversing the direction of the high bandwidth link.

8. The system recited in claim 7 wherein the means responsive to an exchange request message refuses to grant the exchange request if the exchange grant threshold is exceeded.

* * * * *